US011997771B2

(12) United States Patent
Yu

(10) Patent No.: US 11,997,771 B2
(45) Date of Patent: May 28, 2024

(54) SERIES CONNECTED PARALLEL ARRAY OF LEDS WITH OUTPUT RESISTOR

(71) Applicant: Ledup Manufacturing Group Limited, Irwindale, CA (US)

(72) Inventor: Jing Jing Yu, Irwindale, CA (US)

(73) Assignee: LEDup Manufacturing Group Limited, Irwindale, CA (US)

( * ) Notice: Subject to any disclaimer, the term of this patent is extended or adjusted under 35 U.S.C. 154(b) by 57 days.

(21) Appl. No.: 17/975,329

(22) Filed: Oct. 27, 2022

(65) Prior Publication Data

US 2023/0137965 A1 May 4, 2023

Related U.S. Application Data

(60) Provisional application No. 63/263,266, filed on Oct. 29, 2021.

(51) Int. Cl.
*H05B 45/52* (2020.01)
*H05B 45/345* (2020.01)

(52) U.S. Cl.
CPC ........... *H05B 45/345* (2020.01); *H05B 45/52* (2020.01)

(58) Field of Classification Search
CPC ........ H05B 45/40; H05B 45/46; H05B 45/48; H05B 45/52; H05B 45/54; H05B 45/345
See application file for complete search history.

(56) References Cited

U.S. PATENT DOCUMENTS

| | | | | | |
|---|---|---|---|---|---|
| 5,852,348 | A * | 12/1998 | Lin | F21V 23/00 | 315/185 S |
| 6,598,996 | B1 * | 7/2003 | Lodhie | B60Q 1/2607 | 362/249.05 |
| 2002/0043943 | A1 * | 4/2002 | Menzer | H05B 45/54 | 315/291 |
| 2006/0181884 | A1 * | 8/2006 | Li | H01L 25/167 | 362/373 |
| 2010/0079076 | A1 * | 4/2010 | Chang | H05B 45/40 | 315/187 |
| 2010/0315014 | A1 * | 12/2010 | Chang | H05B 45/40 | 315/192 |
| 2012/0194094 | A1 * | 8/2012 | Hsin-Mao | H05B 45/37 | 315/291 |
| 2017/0268734 | A1 * | 9/2017 | Kawaguchi | F21V 23/005 | |
| 2020/0400278 | A1 * | 12/2020 | Shao | H01R 12/75 | |

* cited by examiner

*Primary Examiner* — Tung X Le
(74) *Attorney, Agent, or Firm* — William W. Cochran; Cochran Freund & Young LLC

(57) ABSTRACT

Disclosed is a plurality of LED packages that are connected in a parallel array. A plurality of parallel arrays can also be connected in series to form a series connected parallel array. The LED packages include backup LEDs to provide reliability and continued operation of the LED packages. The LED packages present a standardized impedance in which the resistive values of a series resistor and a parallel resistor are selected to moderate the flow of current when the LEDs become either shorted or open circuited.

8 Claims, 16 Drawing Sheets

SERIES CONNECTED PARALLEL ARRAY OF LEDS WITH OUTPUT RESISTOR

BACKGROUND

LEDs have increasingly been used as luminance sources in various applications. One application where LEDs have become particularly popular in recent years is decorative light strings and pre-lit artificial Christmas trees. Such light strings are usually formed from a plurality of LEDs connected in series and/or parallel, or some combination thereof.

SUMMARY

Present invention may therefore comprise a reliable light emitting diode package comprising: a primary light emitting diode of the light emitting diode package, the primary light emitting diode having a first forward breakdown voltage; a backup light emitting diode connected in parallel with the primary light emitting diode, the backup light emitting diode having a second forward breakdown voltage that is higher than the first forward breakdown voltage; a parallel resistor that is connected in parallel with the primary light emitting diode having a selected parallel resistive value; a series resistor connected in series with the primary light emitting diode, the backup light emitting diode and the parallel resistor, the series resistor having a selected series resistive value that is greater than the parallel resistor resistive value; a voltage source connected to the light emitting diode package that supplies a DC voltage to the light emitting diode package to provide a voltage drop across the primary light emitting diode that is greater than the first forward breakdown voltage and less than the second forward breakdown voltage based upon the selected parallel resistive value and the selected series resistive value.

Present invention may further comprise a method of making a reliable light emitting diode package comprising: selecting a primary light emitting diode that has a first forward breakdown voltage that is less than a second forward breakdown voltage of a backup light emitting diode; connecting the primary light emitting diode in parallel with the backup light emitting diode; connecting a parallel resistor in parallel with the primary light emitting diode and the backup light emitting diode; connecting a series resistor to the parallel resistor, the primary light emitting diode and the backup light emitting diode; providing an input voltage to the light emitting diode package; creating a voltage drop across the primary light emitting diode and the backup light emitting diode that is greater than the first forward breakdown voltage and less than the second forward breakdown voltage by selecting the input voltage and resistive values of the parallel resistor and the series resistor.

Present invention may further comprise a reliable light emitting diode package that has at least one reserve, backup light emitting diode comprising: a primary light emitting diode; a backup light emitting diode; a backup light emitting diode series resistor connected in series with the backup light emitting diode that controls current flowing through the back up light emitting diode; a parallel resistor connected in parallel with the primary light emitting diode and the backup light emitting diode and the first light emitting diode series resistor, the parallel resistor providing a current path through the light emitting diode package if the primary light emitting diode and the backup light emitting diode are burned out.

Present invention may further comprise a method of making a reliable light emitting diode package comprising: connecting at least one backup light emitting diode in series with a backup light emitting diode series resistor to create at least one series connected backup light emitting diode and back up light emitting diode series resistor; connecting a primary light emitting diode in parallel with the at least one series connected backup light emitting diode and backup LED series resistor; connecting a parallel resistor in parallel with the at least one series connected backup light emitting diode and backup light emitting diode series resistor and the primary light emitting diode; selecting the backup light emitting diode series resistor so that current primarily flows though the primary light emitting diode.

DETAILED DESCRIPTION

Figure 1:
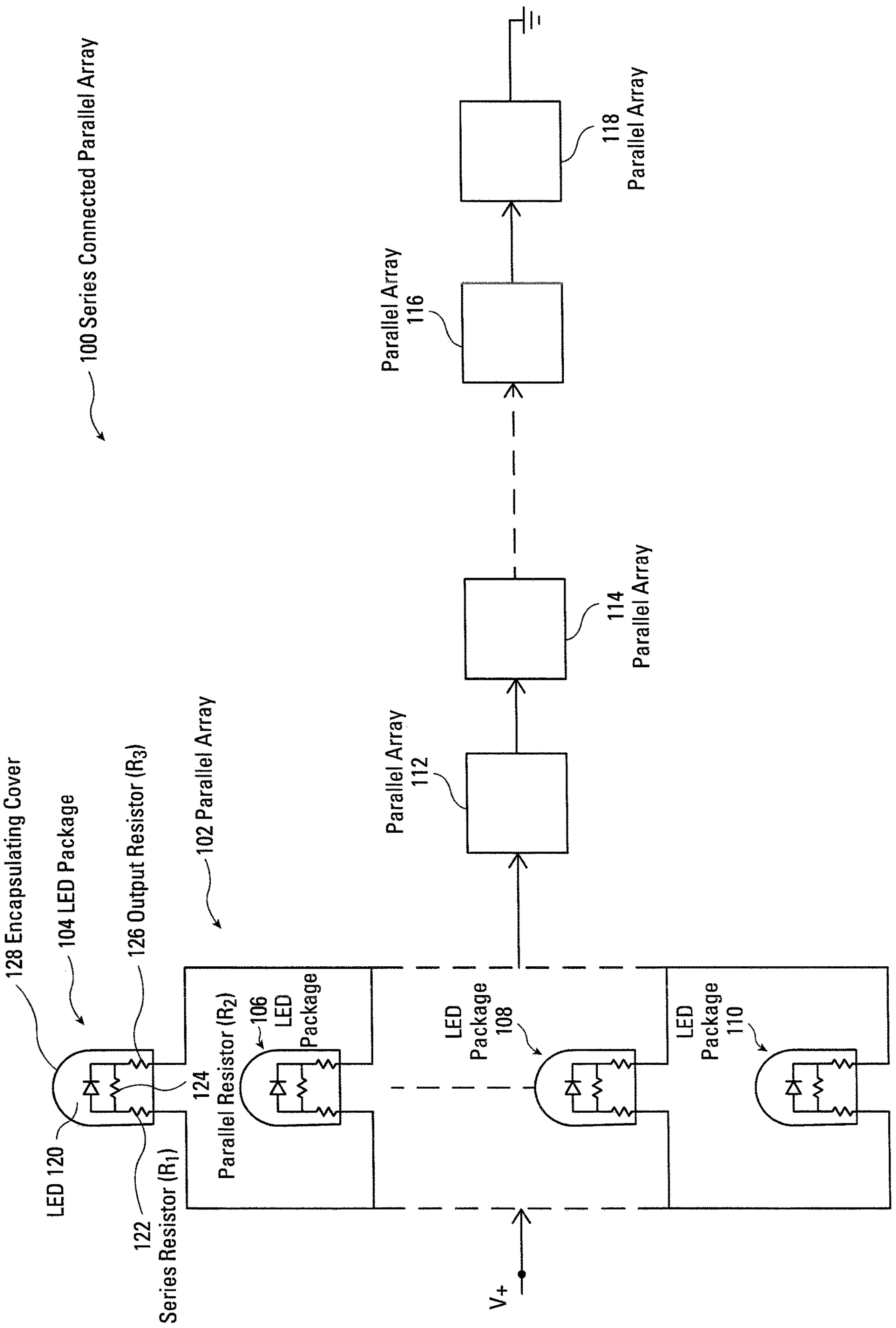
FIG. 1 is a schematic diagram of an embodiment of a series connected parallel array of LEDs.

FIG. 1 is a schematic block diagram of a series connected parallel array 100 that utilize LED packages 104-110. LED packages 104-110 are placed in a parallel array, such as parallel array 102. The parallel array 102 may be utilized in various ways. For example, the parallel array 102 may be placed in a matrix or other geometrical design to create a single light source that has high intensity. Of course, any desired design of a matrix of LED packages such as LED packages 104-110 can be designed for desired purpose. For example, a plurality of LED packages can be mounted closely together to form a source of very bright light. Different color LEDs can be closely mounted together using surface mount technology and the intensity of the different color LEDs can be varied to provide different colors that are perceived by the human eye. Also, the LEDs maybe laid out in a square matrix or a star matrix to provide a source of light for various applications that required a highly reliable source. For example, traffic lights require a highly reliable source of light sense it is not desirable to have traffic lights burning out. Traffic lights can use a square matrix or a star matrix to provide a sufficient amount of light. In addition, it is desirable to have taillights on cars that do not burn out or are short circuited. Using the various circuit designs disclosed herein, a reliable source of light can be generated so that car taillights do not require replacement.

Although FIG. 1 illustrates an encapsulating cover 128 that encapsulates just a single LED package 104, the LED circuits illustrated herein can be laid out so that multiple LED packages are encapsulated under a single encapsulating cover. This greatly enhances the ability of the circuits to resist environmental damage.

Further, the various resistances illustrated in the various circuits disclosed herein, can be provided in a single semi-conductor package when the LEDs are located closely together or separate semi-conductor packages for separated LED packages. This can reduce the expense of mounted individual resistors on a printed circuit boards or other devices for holding LEDs. In another application, the parallel array may be arranged in a waterfall configuration or icicle configuration as part of a light string. As illustrated in FIG. 1, a plurality of LED packages are connected in parallel, such as LED package 104, 106, 108, 110. The number of parallel connected LED packages may be large. For example, 100 or more LED packages may be used in some instances. Of course, the value of the resistors, such as series resistor 122 ($R_1$), parallel resistor 124 ($R_2$) and output resistor 126 ($R_3$), must be considered, as well as the DC voltage (V+) that is applied to the series connected parallel array 100, to ensure that a sufficient amount of current flows through each of the LEDs to illuminate the LEDs, especially when one of the LEDs creates a short circuit or an open circuit.

The size of the series resistor 122 ($R_1$), the parallel resistor 124 ($R_2$) and the output resistor 126 ($R_3$), illustrated in FIG. 1, are selected to moderate the flow of current through the LEDs in the LED packages 106, 108, 110 if one of the LEDs in one of the LED packages 104-110 fails and becomes shorted or burns out and forms an open circuit. In that regard, the voltage (V+) is a DC voltage so that the LED packages 104-110 do not have imaginary impedance. The resistance of the LED 120, however, varies with the amount of current flowing through the LED, as explained in more detail with respect to FIGS. 2A and 2B. Although LEDs, such as LED 120, may not have a measurable resistance, the voltage drop across the connectors of the LED, with an operating current that is sufficient to illuminate the LED 120, can be used to determine the resistance of the LED. When LED 120 forms an open circuit, the current will pass through the parallel resistor 124 ($R_2$), the series resistor 122 ($R_1$) and the output resistor 126 ($R_3$). The equivalent resistance of the circuit, when the LED 120 is an open circuit, is the resistance of the series resistor 122 ($R_1$), plus the parallel resistor 124 ($R_2$), plus the output resistor 126 ($R_3$). In that instance, to moderate the flow of current through the LED package 104, the parallel resistor 124 ($R_2$) should have a resistive value that is less than the resistive value of the series resistor 122 and output resistor 126 ($R_3$), and preferably have a low resistance compared to the resistive value of series resistor 122 ($R_1$) and output resistor 126 ($R_3$). The current through the series resistor 122 ($R_1$) changes proportionally with the amount of added resistance from parallel resistor 124 ($R_2$).

When LED 120, of FIG. 1, becomes short circuited, parallel resistor 124 ($R_2$) is essentially eliminated from the circuit so that the only resistance in the circuit is series resistor 122 ($R_1$) and output resistor 126 ($R_3$). Elimination of the parallel resistor 124 ($R_2$), which has a small resistance, would therefore not change the flow of current through series resistor 122 ($R_1$) by a substantial amount. In that regard, the term substantial and substantially, as used herein, means a change of not more than about 20%. Again, the resistive value of parallel resistor 124 ($R_2$) should be less than the resistive value of series resistor 122 ($R_1$) and preferably the resistive value of the parallel resistor 124 ($R_2$) should be low compared to the resistive value of series resistor 122 ($R_1$). At the same time, the resistance of the parallel resistor 124 ($R_2$) should be greater than the resistance of the LED 120, and preferably much greater than the resistance of LED 120, so that a primary portion of the current that flows through series resistor 122 ($R_1$) also flows through LED 120. Since the parallel resistor 124 ($R_2$) is in parallel with the LED 120, the amount of current flowing through the LED 120 is proportionally related to the resistance of LED 120 and parallel resistor 124 ($R_2$).

As also illustrated in FIG. 1, additional parallel array packages 112-118 are connected in series with parallel array 102. For example, the series connected parallel array 100 may include parallel array 102, and parallel arrays 112, 114, 116 and 118, which are all connected in series, as illustrated in FIG. 1. Any desired number of parallel arrays can be connected in series as long as there is sufficient voltage (V+) and the power supply for the circuit can provide an adequate amount of current.

Although LED packages have been used for replacement LEDs to ensure that replacement LEDs provide a constant illumination across an LED string, such as disclosed in U.S. Pat. No. 8,823,270 issued Sep. 2, 2014, which is specifically incorporated herein for all that it discloses and teaches, LED packages that moderate the flow of current to other LEDs in a parallel array, in case of a shorted or open LED, and that provide back illumination, have not been used in parallel arrays in hardwired circuits. Of course, the advantage of using LED package 104 in a parallel array is that current change in other LED packages of the LED array is moderated when there are either shorted or open circuited LEDs in the array. A change in current flowing through a particular LED package in the parallel array 102 changes the amount of current flowing through the other LED packages in the parallel array, which could either cause the other LEDs in the array to dim or increase in brightness. If additional current flows through the other LEDs in the array, the lifetime of the LED can be shortened, and a safety hazard could be created. The parallel configuration of the parallel array 102, as well as the parallel connected resistor in each LED package 104-110, allows current to keep flowing in the series connected parallel array 100 if a LED in any of the LED packages 104-110 becomes an open circuit.

Further, the structure of the sockets and the mounting of the LED bulbs for replaceable LEDs is expensive and is prone to various problems. For example, the connections of replaceable bulbs in a light string are normally not waterproof. Corrosion can occur in the connections for replaceable bulbs, especially when light strings and lighting fixtures are used outside. Hardwired light strings and light fixtures with non-replaceable bulbs are easier and less expensive to construct and can provide waterproofing for outdoor use. In addition, the encapsulation using the encapsulating cover 128 greatly adds to the waterproofing of the LED package 104. Of course, the problem is that if an LED package has an LED that either burns out and becomes an open circuit or fails and becomes a short circuit, the LED will not produce light and may cause an increase or decrease in the current flowing through the other LED packages and can short out the entire LED array 102. Replaceable LED packages can prevent this from occurring but suffer from all of the disadvantages mentioned above. In addition to the disadvantages mentioned above, it is often difficult to identify an LED package or LED that has burned out or failed, which further complicates the issue of replacing LED light packages.

Figure 2A:
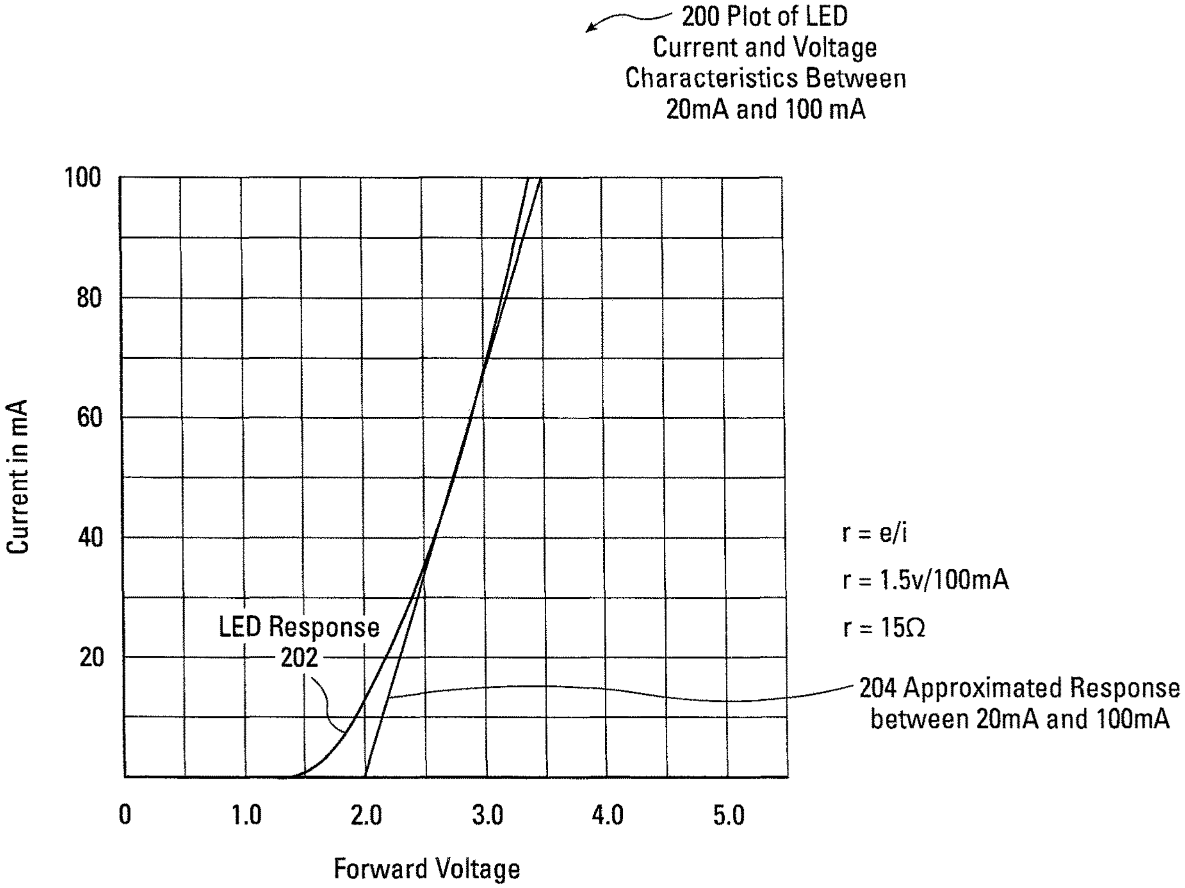
FIG. 2A is a plot of LED current and voltage characteristics for a typical LED in a current range of 20 mA to 100 mA.

FIG. 2A is a plot 200 of the nonlinear relationship between the current and voltage applied to a typical LED. As illustrated in FIG. 2A, the LED response curve 202 has a somewhat constant slope over a range of operating currents from 40 mA to about 100 mA. As also illustrated in FIG. 2A, the forward breakdown voltage of the LED is about 1.5 volts. In other words, the voltage drop across a typical LED must be approximately 1.5 volts before current starts to flow through the LED. At voltages of about 3 volts across the LED, about 60 mA flows through this typical LED. The slope of the curve of FIG. 2A is equivalent to the resistance of the LED for the current flowing through the LED and the voltage across the LED. Accordingly, the resistance of the LED is the first derivative of the change in voltage over the change in current.

FIG. 2A also illustrates the LED response 202 between 20 mA and 100 mA. As shown, the LED response 202 is a nonlinear curve 202 that can be approximated by an approximated linear response 204 between approximately 20 mA and 100 mA. The approximated linear response 204 has a change of voltage between 20 mA and 100 mA of approximately 1.5 volts. Since the resistance is the change in voltage over the change in current, the resistance of a typical LED having a forward current of between 20 mA and 100 mA is approximately 15Ω, as illustrated in FIG. 2A.

Figure 2B:
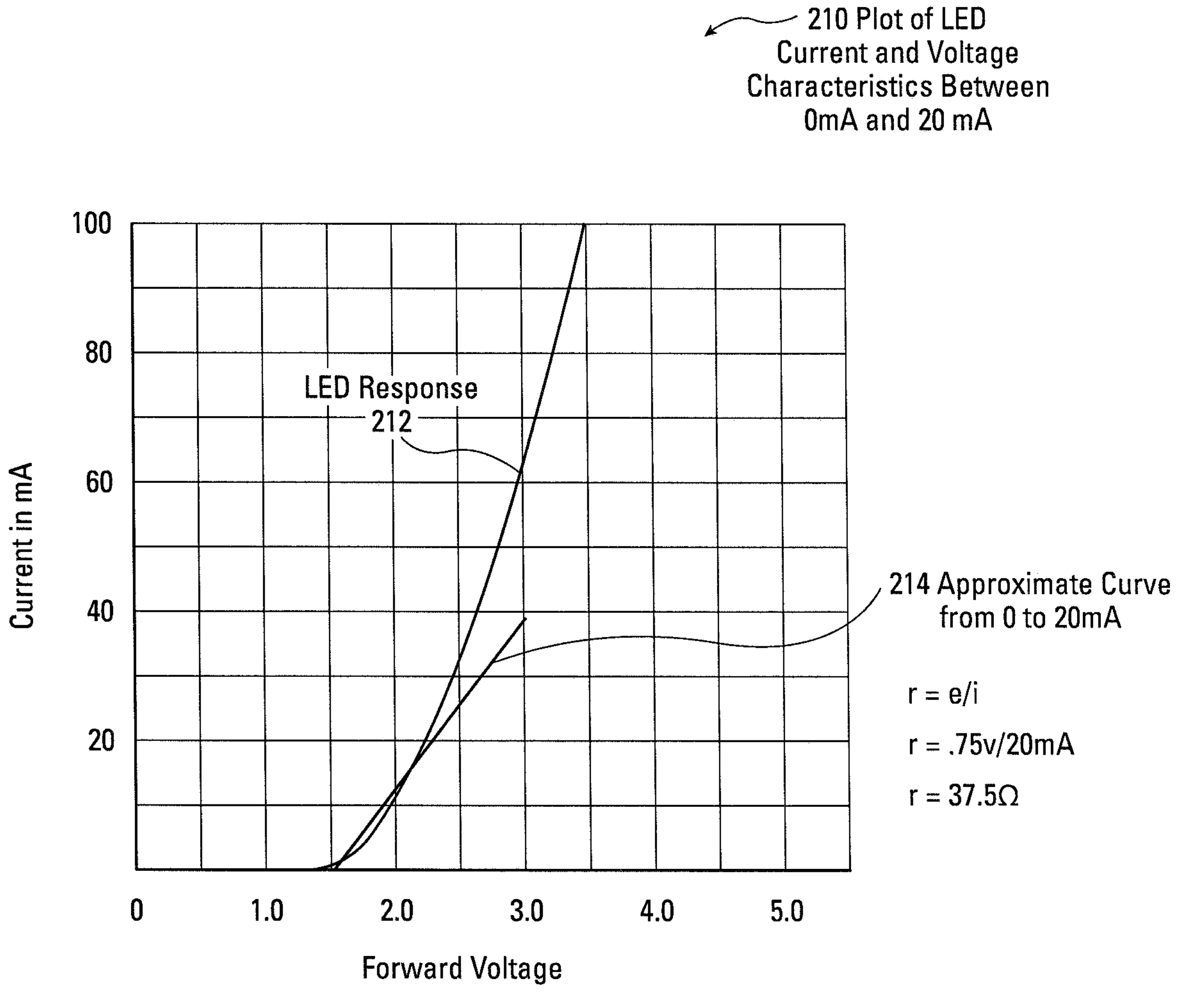
FIG. 2B is a plot of LED current and voltage characteristics for a typical LED between 0 mA and 20 mA.

FIG. 2B is a plot 210 of current and voltage characteristics of a typical LED between 0 mA and 20 mA. As illustrated in FIG. 2B, the LED response 212 is nonlinear. This is the same response as the LED response 202 illustrated in FIG. 2A, which is for a typical LED. LEDs, however, can vary, especially LEDs that are constructed to generate different light colors. Accordingly, different types of LEDs, such as various color LEDs, may have much different response curves. The LED response curves 202, 212 of FIGS. 2A and 2B, respectively, are typical LED response curves for a white light LED.

An approximated response curve 214 from 0 mA to 20 mA indicates the average slope of the nonlinear LED response 212. This average slope is the average resistance between 0 mA and 20 mA or about 1.5 volts to 2.25 volts. The slope of this curve is calculated by taking the voltage 0.75 volts, which is the change in forward voltage between 0 mA and 20 mA and dividing that by the change in current, which is 20 mA. This results in a resistance of 37.5Ω as an average resistance over a current change of 0 mA to 20 mA.

As indicated above, it is advantageous to have a reliable LED light string, such as the series connected parallel array 100, illustrated in FIG. 1, which operates in a reliable fashion in a wide range of environmental conditions and does not rely on replaceable light packages. As pointed out above, hardwired light strings have much greater reliability than light strings with replaceable LED elements. In that regard, if an LED in the series connected parallel array 100 (FIG. 1) is burned out and becomes an open circuit or fails and creates a short circuit, it is desirable that the series connected parallel array 100 (FIG. 1) continues to operate and continues to provide a light source for each of the LED packages, such as LED package 104 (FIG. 1), and minimizes the change in current flowing through the LED packages in each of the parallel arrays for either open circuits created by a burned out LED or a short circuit created by a failed LED.

Figure 3:
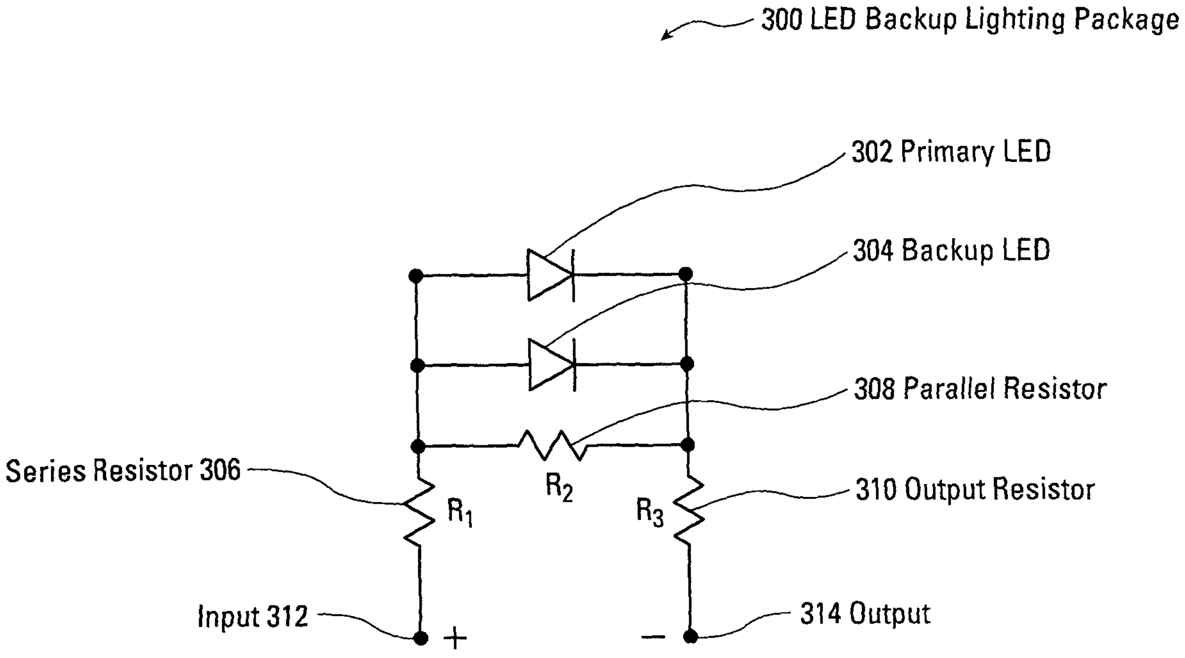
FIG. 3 is a schematic circuit diagram of a backup lighting package.

FIG. 3 is a schematic circuit diagram of an LED backup lighting package 300 that utilizes a primary LED 302 that generates light and a backup LED 304 that constitutes a backup LED that operates if LED 302 creates an open circuit. As shown in FIG. 3, an input 312 receives a voltage that is greater than the forward breakdown voltage of primary LED 302. For example, the typical LED illustrated in FIG. 2A has a forward breakdown voltage of about 1.5 volts. Backup LED 304 has a higher forward breakdown voltage so that current does not flow through backup LED 304 unless the voltage across parallel resistor 308 ($R_2$) is equal to or greater than the forward breakdown voltage of the backup LED 304. The voltage drop across parallel resistor 308 ($R_2$) can be controlled by the size of the parallel resistor 308 ($R_2$), the amount of voltage applied to the input 312 and the size of the series resistor 306 ($R_1$) and the output resistor 310 ($R_3$). If primary LED 302 is burned out and creates an open circuit, the current will then flow through backup LED 304, as set forth in more detail below with respect to FIG. 6.

Figure 4:
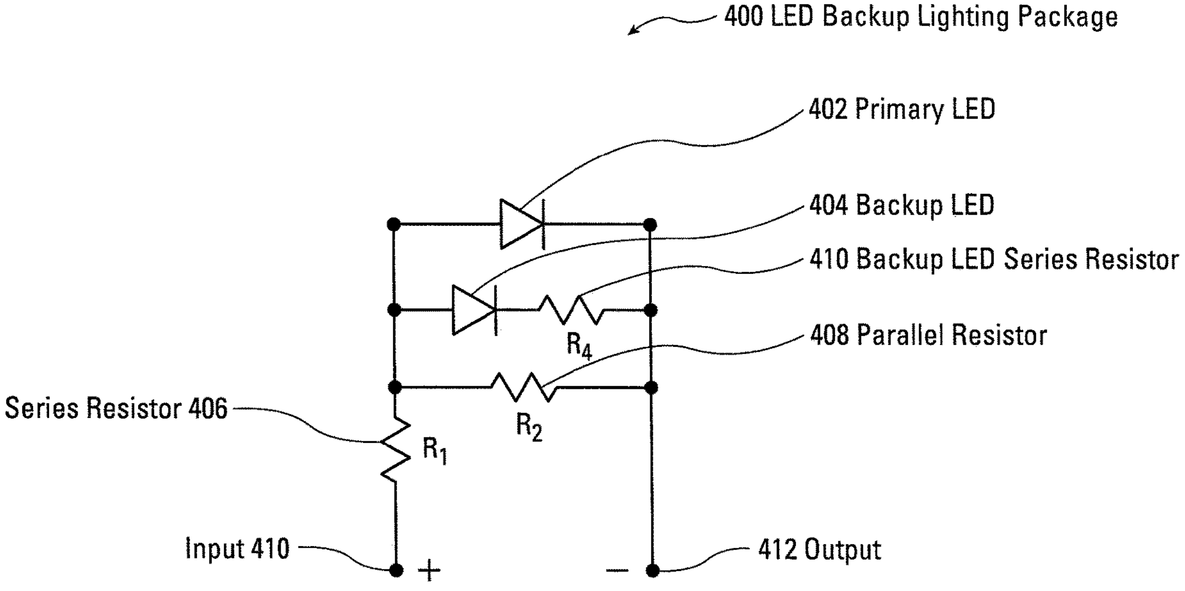
FIG. 4 is a schematic circuit diagram of another embodiment of an LED backup lighting package.

FIG. 4 is an illustration of an LED backup lighting package 400 that is similar to the LED backup lighting package 300 of FIG. 3, but has a backup LED series resistor 410 ($R_4$) and does not have the output resistor 310 ($R_3$). The circuit of FIG. 4 operates essentially in the same manner as the circuit of FIG. 3 except that backup LED 404 does not have to be selected to have a higher forward breakdown voltage. The resistance of series resistor 406 ($R_1$) can be increased to the value of series resistor 306 ($R_1$) and output resistor 310 ($R_3$) of FIG. 3. This eliminates the need for output resistor 310 ($R_3$). The primary LED 402 does not have to be selected to have a lower forward breakdown voltage than backup LED 404 since backup LED series resistor 410 ($R_4$) impedes the flow of current through backup LED 404 so that current primarily flows through primary LED 402.

The voltage drop across the primary LED 402, as illustrated in FIG. 4, is controlled by the input voltage 410 versus the output voltage 412, the size of the series resistor 406 ($R_1$), the parallel resistor 408 ($R_2$) and the cumulative resistance of backup LED series resistor 410 ($R_4$) plus the resistance of backup LED 404. The size of backup LED series resistor 410 ($R_4$) has a linear effect on the amount of current flowing through primary LED 402 versus the amount of current flowing through backup LED 404. If primary LED 402 becomes burned out and creates an open circuit, current will flow through backup LED 404 and the LED backup lighting package 400 will remain lit. The voltage drop across primary LED 402 and backup LED 404 in series with backup LED series resistor 410 ($R_4$) is equal to the current flowing through primary LED 402 times the resistance of primary LED 402. Assuming that the current flowing through primary LED 402 is between 20 mA and 100 mA, as illustrated in FIG. 2A, which is a standard operating current for typical LEDs, the voltage drop across primary LED 402 is the resistance of primary LED 402 times the current flowing through primary LED 402, which, for typical LEDs, would be about 15Ω times the current flowing through primary LED 402. The amount of current flowing through backup LED 404 and backup LED series resistor 410 ($R_4$) is equal to the voltage drop across primary LED 402 divided by the sum of the resistance of backup LED 404 and backup LED series resistor 410 ($R_4$). The resistance of backup LED 404 is dependent upon the current flowing through backup LED 404, as shown by the LED response curve 202 of FIG. 2A and response curve 212 of FIG. 2B.

For the purposes of design of the circuit of FIG. 4 to determine resistances, voltages and current flowing in the circuit under different conditions, it can be assumed that backup LED 404 is operating in the linear operating range, as illustrated in FIG. 2A, and the resistance of 15Ω could be assumed for backup LED 404. The voltage drop across primary LED 402 divided by the assumed resistance of 15Ω of backup LED 404, plus the resistance of backup LED series resistor 410 ($R_4$) would provide an assumed current flowing through backup LED 404. If that assumed current is below 20 mA or is 10 mA or less, the resistance of backup LED 404 would increase greatly in a non-linear manner, resulting in the current flowing through backup LED 404 to be reduced in a non-linear manner. In other words, the resistance of backup LED series resistor 410 ($R_4$) can have a nonlinear effect on the amount of current that is flowing through backup LED 404. As such, smaller and slighter changes in the resistive value of backup LED series resistor 410 ($R_4$) can have a large, nonlinear effect on the amount of current flowing through backup LED 404. Therefore, a relatively small resistive value for backup LED series resistor 410 ($R_4$), compared to the resistive value of parallel resistor 408 ($R_2$) can greatly reduce the amount of current flowing through backup LED 404. Accordingly, the resistive value of backup LED series resistor 410 ($R_4$) can be significantly lower than the resistive value of the parallel resistor 408 ($R_2$). In that case, if primary LED 402 burns out, more current will flow through backup LED 404 and backup LED series resistor 410 ($R_4$) rather than parallel resistor 408 ($R_2$) because the combined resistance of backup LED 404 and backup LED series resistor 410 ($R_4$) would be smaller than the resistive value of parallel resistor 408 ($R_2$) because of the nonlinear effect of the resistive value of backup LED series resistor 410 ($R_4$) which allows the resistive value of backup LED series resistor 410 to be small compared to the resistive value of parallel resistor 408 ($R_2$). So, if primary LED 402 burns out and becomes an open circuit, backup LED 404 will illuminate almost as brightly as primary LED 402 was illuminated prior to being burned out. The less current flowing through backup LED 404 while primary LED 402 is lit, the longer the lifetime of backup LED 404. Consequently, backup LED 404 can be used as a backup or reserve LED to primary LED 402, which may become burned out and create an open circuit over a period of time. This provides a redundant or alternate LED light source in LED backup lighting package 400. Series resistor 406 ($R_1$) and parallel resistor 408 ($R_2$) are also necessary to ensure that the LED backup lighting package 400 continues to conduct current and does not short out LED lighting package 400 if LEDs 402, 404 become open circuits or short circuits, as explained in more detail below.

An advantage of the circuit of FIG. 4 is that the primary LED 402 and backup LED 404 do not have to be selected so that the backup LED 404 has a higher forward breakdown voltage than primary LED 402, as required in FIG. 3. In addition, the voltage drop across primary LED 402 does not have to be carefully controlled to fall between the forward breakdown voltage of primary LED 402 and backup LED 404. The use of the backup LED series resistor 410 ($R_4$) impedes the flow of current through backup LED 404 and creates an additional voltage drop so that the entire voltage drop does not occur across backup LED 404. In this manner, the voltage drop across backup LED 404 can be less than the voltage drop across primary LED 402 which greatly reduces or eliminates the flow of current though the backup LED 404.

Figure 5A:
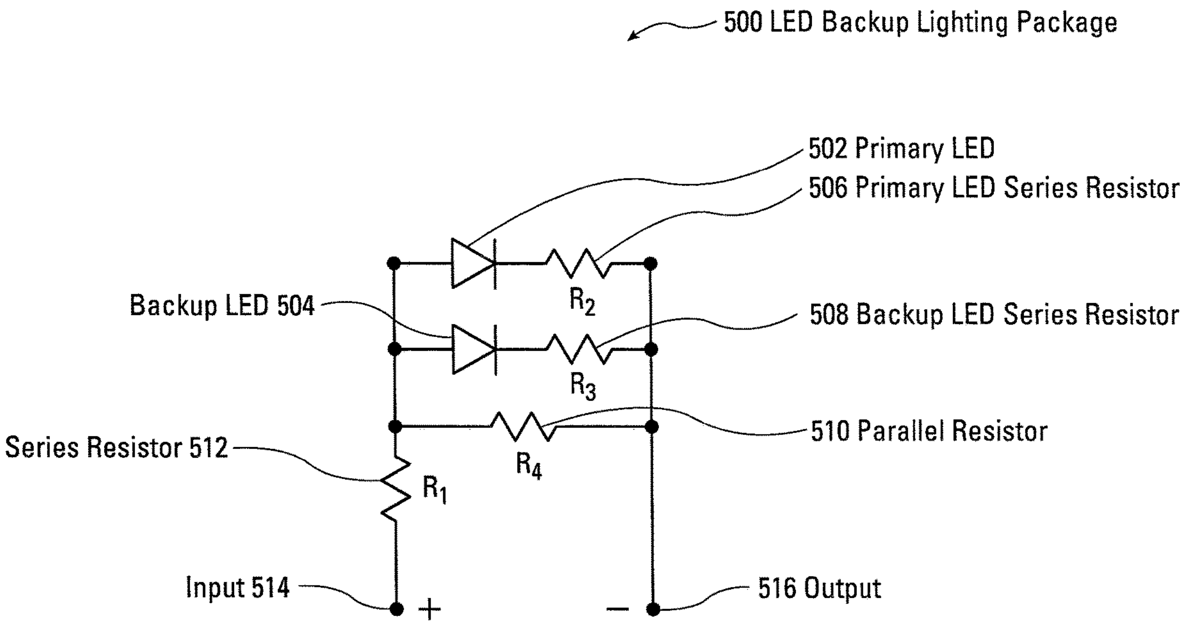
FIG. 5A is a schematic circuit diagram of another embodiment of an LED backup lighting package.

FIG. 5A is a circuit schematic diagram of another embodiment of the present invention. The LED backup lighting package 500, illustrated in FIG. 5A, shows a primary LED 502 in series with a primary LED series resistor 506 ($R_2$) and backup LED 504 in series with a backup LED series resistor 508 ($R_3$). Backup LED 504 and backup LED series resistor 508 ($R_3$) are connected in parallel with primary LED 502 and primary LED series resistor 506 ($R_2$). A parallel resistor 510 ($R_4$) is further connected in parallel. Series resistor 512 ($R_1$) provides a series resistance to the LED backup lighting package 500. FIG. 5 is similar to the circuit of FIG. 4, but includes an additional primary LED series resistor 506 ($R_2$), which allows greater control of the amount of current flowing through primary LED 502 versus backup LED 504. Again, backup LED series resistor 508 ($R_3$) can moderate the flow of current through backup LED 504 so that the primary amount of current flows through primary LED 502. If primary LED 502 burns out and becomes an open circuit, current will flow through backup LED 504 and the LED backup lighting package 500 will remain lit, as disclosed in more detail below with respect to FIG. 9.

Figure 5B:
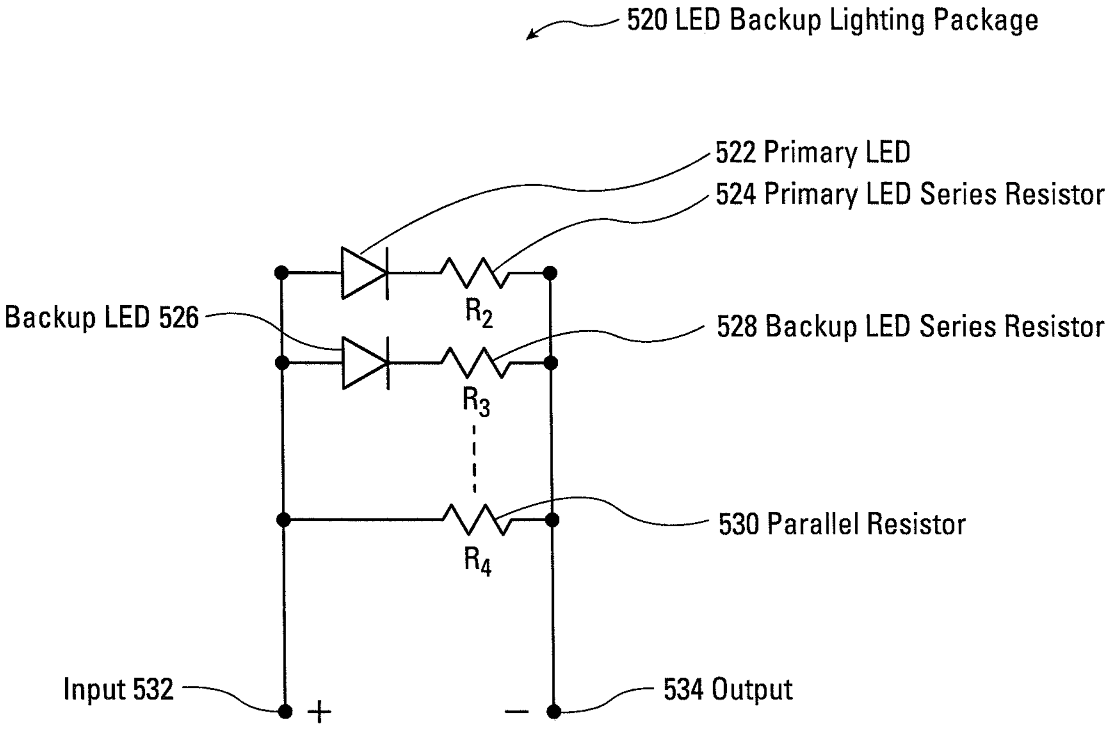
FIG. 5B is a schematic circuit diagram of another embodiment of an LED backup lighting package.

FIG. 5B is a schematic circuit diagram of another embodiment of a LED backup lighting package 520. An input voltage 532 is applied to the LED backup lighting package 520 which creates a voltage drop at output 534. A primary LED 522 is connected in series with a primary LED series resistor 524. A backup LED 526 is connected in series with a backup LED series resistor 528 ($R_3$). Additional backup LEDs and backup LED series resistors can be placed in the circuit and connected in parallel to the back up LED 526 and back up LED series resistor 528 ($R_3$). In that case, each of the additional backup circuits would utilize resistors that have progressively higher resistive values. For example, primary LED series resistor 524 ($R_2$) has a preselected resistance that controls the amount of current flowing through the primary LED 522. Backup LED series resistor 528 ($R_3$) has a larger resistance than primary LED series resistor 524 so that the primary amount of current, or all of the current, flows through the primary LED 522 rather than the backup LED 526. Again, when the current values are low through the backup LED 526, the resistance of the backup LED 526 becomes greater, which further reduces the amount of current flowing through backup LED 526 and backup LED series resistor 528 ($R_3$). If additional backup LEDs are connected to the LED backup lighting package, the series resistance for each additional backup LED becomes larger. Parallel resistor 530 ($R_4$) provides a current path if primary LED 522 and backup LED 526 become burned out. In this manner, the LED backup lighting package 520 continues to conduct current so that other LED backup lighting packages in a parallel array do not have a substantial increase in current which can shorten the lifetime of the LEDs and the additional LED backup lighting packages. Parallel resistor 530 ($R_4$) should have a resistance that is higher than the primary LED series resistor 524 and the backup LED series resistor 528 ($R_3$) and any other backup LED series resistors connected to the circuit FIG. 5B. The reason for this is that the amount of current flowing through the primary LED 522 and any backup LED should be greater than the current flowing parallel resistor 530 ($R_4$) for purpose of efficiency.

The advantage of the circuit of FIG. 5B is that a series resistor is not required to prevent the LED backup lighting package 520 from shorting out and shorting out all of the other LED lighting packages connected in parallel with the LED backup lighting package 520. For example, without the series resistor 406 of FIG. 4, the LED backup lighting package 400 would be shorted out if primary LED 402 shorted.

Figure 5C:
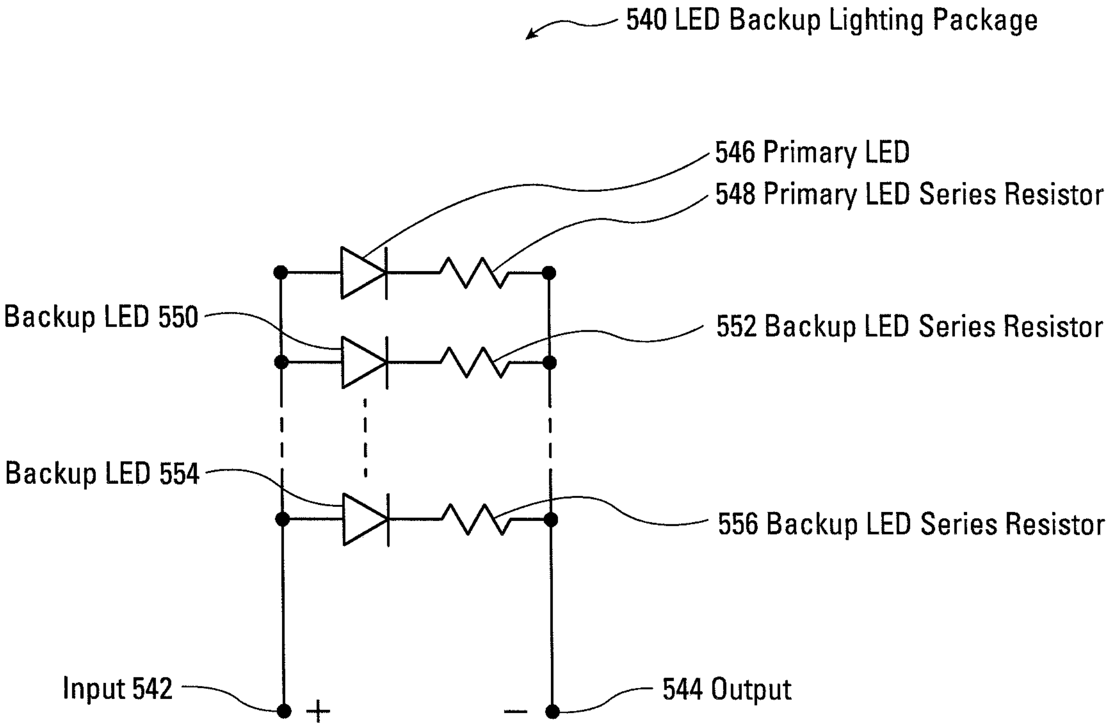
FIG. 5C is a schematic circuit diagram of another embodiment of an LED backup lighting package.

FIG. 5C is a schematic circuit diagram of another embodiment of an LED backup lighting package 540. As illustrated in FIG. 5C, a positive voltage is applied to input 542. The DC voltage at input 542 causes current to flow through primary LED 546 and primary LED series resistor 548, which, in combination, have a resistance that creates a current through primary LED 546 and primary LED series resistor 548 that is in the primary linear response range of the primary LED 546, i.e., in a current range in which the primary LED 546 has a substantially constant resistance. As illustrated in FIG. 2A, that occurs in the current range of 30 mA to about 90 mA for a typical LED.

As also shown in FIG. 5C, backup LED 550 is connected in series with backup LED series resistor 552. The combined resistance of backup LED 550 and backup LED series resistor 552 is sufficiently high that little or no current flows through backup LED 550 and backup LED series resistor 552 when current is flowing through primary LED 546 and primary LED series resistor 548. Backup LED series resistor 552 has a resistance that is sufficiently high that the combined resistance of backup LED 550 and backup LED series resistor 552 causes the current to be in the nonlinear response curve of backup LED 550, such as shown in FIG. 2A, which is between 0 mA and 20 mA. In other words, the resistance of backup LED series resistor 552 in combination with backup LED 550 for the particular voltage drop between input 542 and output 544 is such that backup LED 550 has a very high resistance, which impedes the flow of current through backup LED 550. However, if primary LED 546 burns out and becomes an open circuit, the voltage drop between input 542 and output 544 causes current to flow through backup LED 550 and backup LED series resistor 552 since backup LED series resistor 552 has a resistance that allows to current to flow through backup LED 550 and backup LED series resistor 552 when no current is flowing through primary LED 546 and primary LED series resister 548. As a result, primary LED 546 is illuminated until primary LED 546 burns out, at which time backup LED 550 becomes illuminated. This is a result of selecting the primary LED series resistor 548 and backup LED series resistor 552 to allow the backup LED 550 to function as a backup LED. Again, this is dependent upon the voltage drop between input 542 and output 544 and the values of primary LED series resistor 548 and backup LED series resistor 552. The same is true for backup LED 554 and backup LED series resistor 556. If both the primary LED 546 and the backup LED 500 are burned out and become open circuits, the voltage drop between input 542 and output 544 is sufficient to allow current to flow through backup LED series resistor 556 and backup LED 554 in the linear range, as illustrated in FIG. 2A. In this manner, a series of backup LEDs can be provided in a single circuit so that if an LED burns out and becomes an open circuit, one or more backup. LEDs can become activated. As illustrated in FIG. 5C, there are three LEDs, but additional LEDs, or only two LEDs, may be used to provide backup.

Figure 5D:
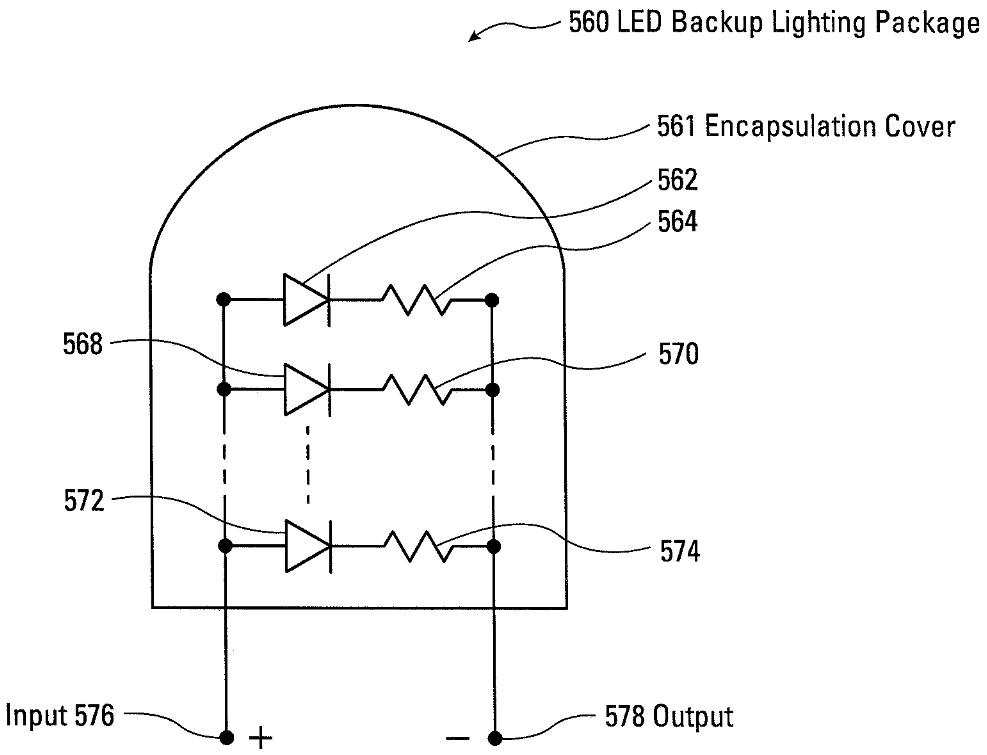
FIG. 5D is a schematic circuit diagram of another embodiment of an LED backup lighting package.

FIG. 5D illustrates another embodiment of an LED backup lighting package 560. As shown in FIG. 5D, an encapsulation cover 561 encapsulates the entire circuit. As illustrated in FIG. 5D, the circuit, such as shown in FIG. 5C, is entirely encapsulated within the encapsulation cover 561. This includes the LEDs 562, 568 and 572, as well as the resistors 564, 570, 574. In that regard, the encapsulated LED backup lighting package 560 can be used as a single LED having an input voltage 576 and an output voltage 578. However, the LED backup lighting package 560 is extremely reliable and has an extended lifetime.

Figure 5E:
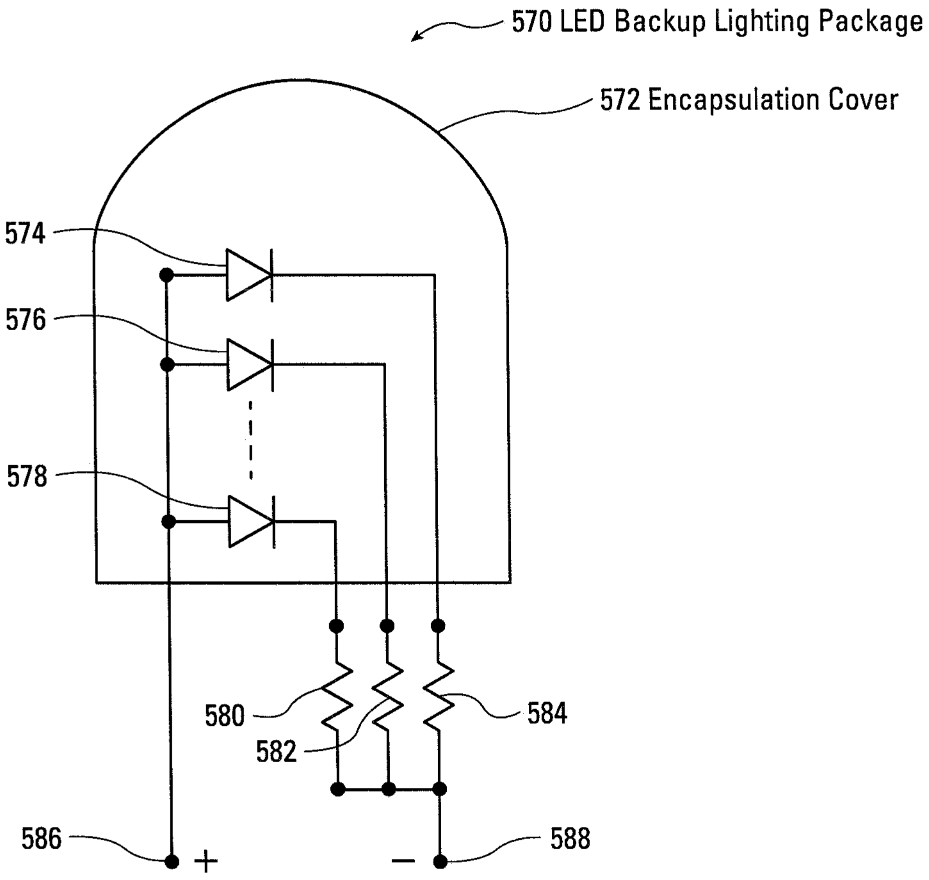
FIG. 5E is a schematic circuit diagram of another embodiment of an LED backup lighting package.

FIG. 5E is a schematic circuit diagram of another embodiment of an LED backup lighting package 570 that uses an encapsulation cover 572. The encapsulation cover 572 encapsulates the LEDs 574, 576, 578. Resistors 580, 582, 584 are connected to the leads for each of the outputs of the LEDs 574, 576, 578 and then connected together to create output 588. In this manner, each of the resistors can be connected to the LEDs outside of the encapsulation cover 572. Again, the voltage applied to input 586 causes a voltage drop across LEDs 574, 576, 578 and the corresponding resistors 584, 582, 580, which allows the LEDs 574, 576, 578 to be sequentially activated when an LED burns out and becomes an open circuit based upon the applied voltage and the resistances of resistors 584, 582, 580.

Figure 5F:
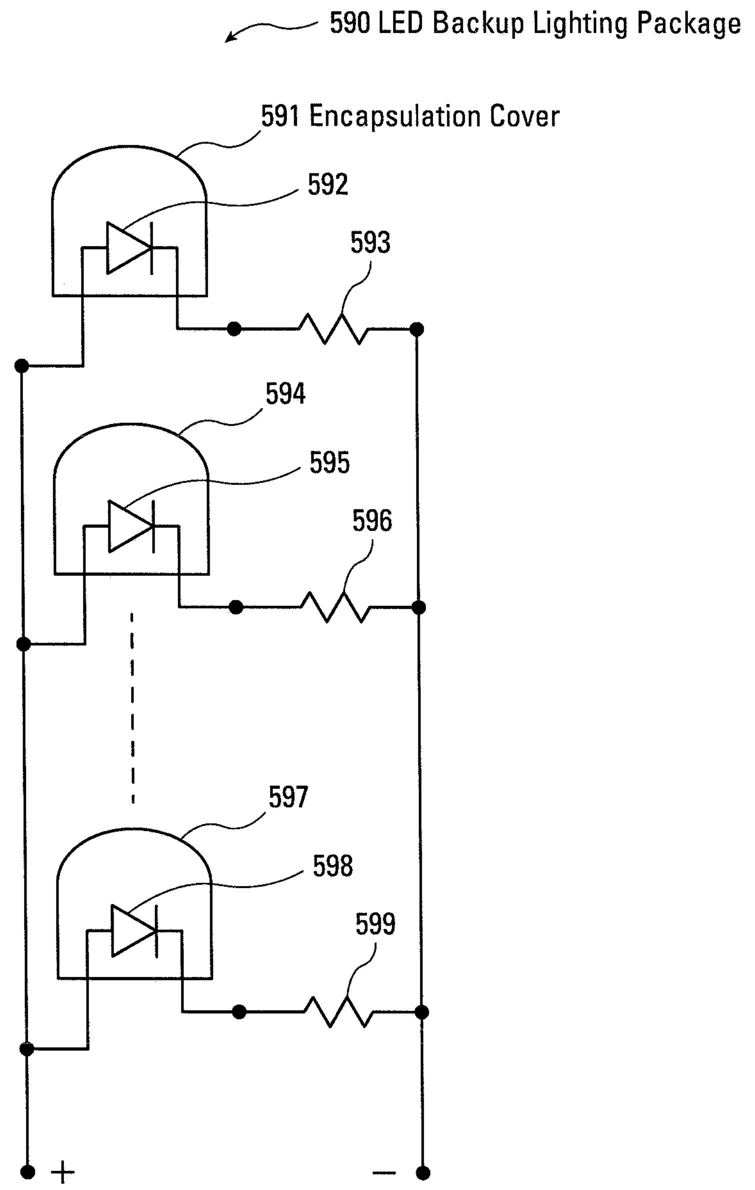
FIG. 5F is a schematic diagram of another embodiment of an LED backup lighting package.

FIG. 5F is another embodiment of an LED backup lighting package 590. As illustrated in FIG. 5F, encapsulation cover 591 encapsulates an LED 592. A resistor 593 is connected to the output of LED 592 on a connector that is exterior to the encapsulation cover 591. Similarly, encapsulation cover 594 encapsulates LED 595. A resistor 596 is connected to the output of LED 595 at a location that is exterior to the encapsulation cover 594. An encapsulation cover 597 encapsulates an LED 598. An external resistor 599 is attached to the output of the LED 598. Each of the resistors 593, 596, 599 are connected together to the output of the circuit. Again, connecting resistor 593, 596, 599 outside of the encapsulation covers 591, 594, 597 allows for manual or automated connections of the resistors. The resistors 593, 596, 599 can also be soldered in an automated fashion. Each of the encapsulated covers 591, 594, 597 allows each one of the LEDs 592, 595, 598 to be separately fabricated and encapsulated. The resistors 593, 596, 599 are selected based upon the input voltage and allow the LEDs 592, 595, 598 to be actuated in a serial fashion if the LEDs become open circuits.

Figure 6:
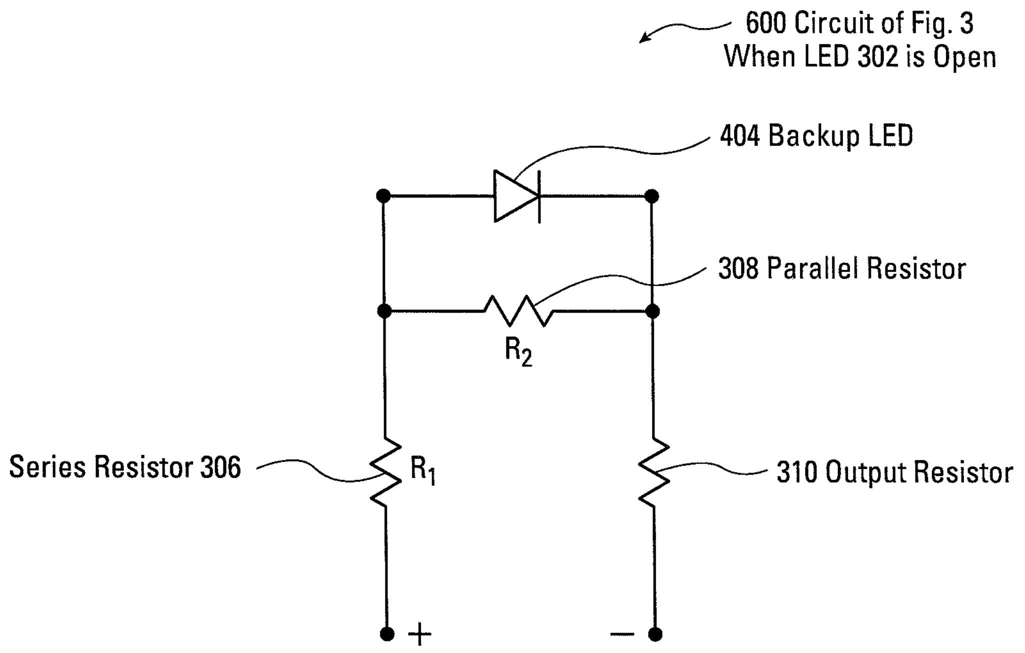
FIG. 6 is a schematic circuit diagram of the circuit of FIG. 3 when LED 302 is burned out and creates an open circuit.

FIG. 6 is a schematic illustration of the circuit of FIG. 3 when primary LED 302 burns out and becomes an open circuit. Current is forced to flow through the backup LED 404. For a typical LED, the resistance of backup LED 404 may be around 15Ω. Consequently, it is advantageous to have the resistance of parallel resistor 308 ($R_2$) in the range of 15Ω or greater so that at least half of the current flows through the backup LED 404. The circuit may not be as efficient as other circuits, but the advantage is that the LED package continues to remain lit and the impedance of the LED package does not change substantially so that a substantially larger amount or smaller amount of current is not flowing through the other LED packages in the parallel arrays, illustrated in FIG. 1. As mentioned above, if the current through an LED increases substantially, the LED will burn out, or otherwise have a substantially shortened lifetime. If less current flows through an LED, the LED will become dimmer. It is therefore advantageous to design the LED packages so that when an LED burns out and creates an open circuit, or fails and creates a short circuit, the input resistance to the LED package does not change substantially. In that regard, if backup LED 404 also burns out and becomes an open circuit, current will continue to flow through parallel resistor 308 ($R_2$) so that the input impedance of the LED package does not change substantially.

Figure 7:
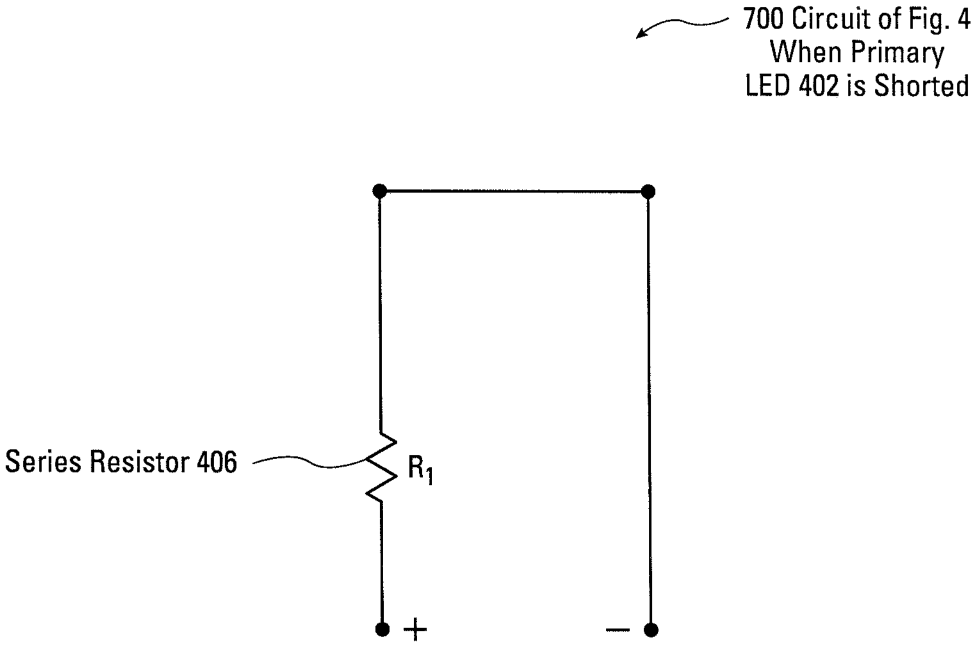
FIG. 7 is a schematic circuit diagram of the circuit of FIG. 3 when either LED 302 or LED 304 fails and becomes a short circuit.

FIG. 7 is a schematic illustration of the equivalent circuit of LED backup lighting package 400 when LED 402 of FIG. 4 fails and creates a short circuit. In this case, only the series resistor 406 ($R_1$) remains in the circuit. Without the series resistor 406 ($R_1$), the LED package would be shorted out and all of the LED packages in parallel with this LED package would also be shorted out. This would cause all of the LED packages in parallel to go dark.

Figure 8:
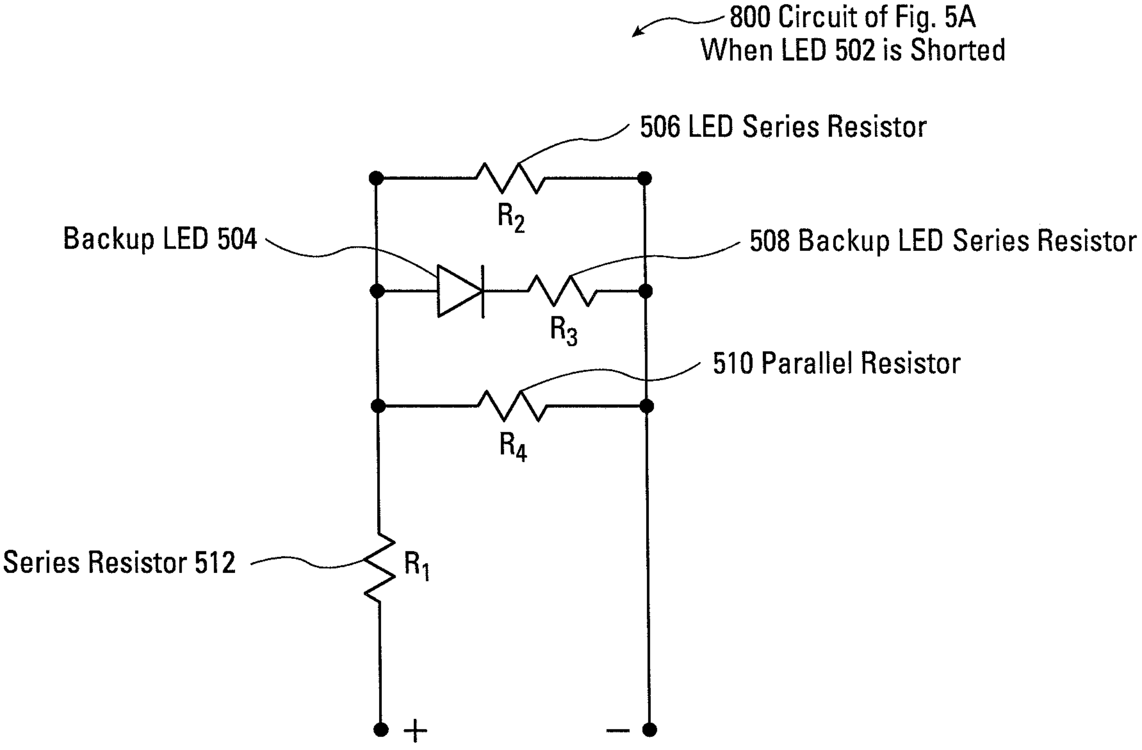
FIG. 8 is a schematic circuit diagram of the circuit of FIG. 5A if LED 502 fails and becomes a short circuit.

FIG. 8 is an equivalent circuit diagram 800 for LED backup lighting package 500 when primary LED 502 of FIG. 5A fails and shorts out. In this case, the LED series resistor 506 ($R_2$) is in parallel with the backup LED 504 and the backup LED series resistor 508 ($R_3$), and also in parallel with parallel resistor 510 ($R_4$). As such, current continues to flow through the backup LED 504 so that the LED package remains lit. The size of the resistors 506 ($R_2$), 508 ($R_3$), 510 ($R_4$) can be adjusted to adjust the amount of current flowing through backup LED 504.

Figure 9:
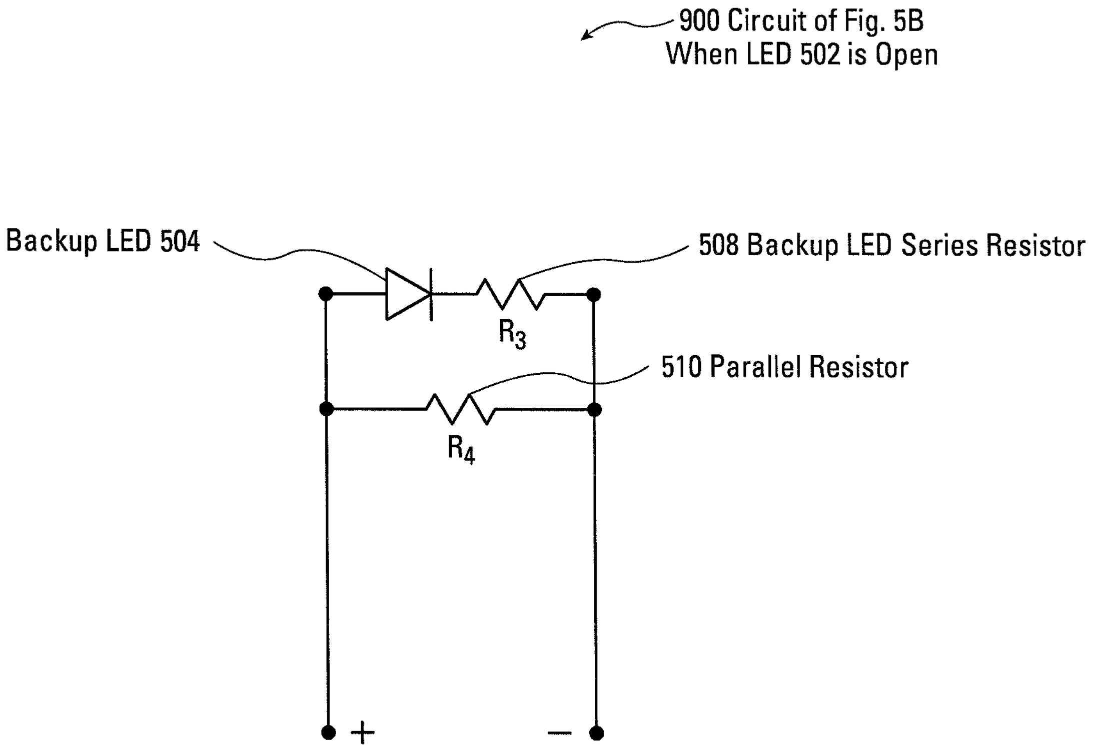
FIG. 9 is a schematic circuit diagram of the circuit of FIG. 5B when LED 502 is burned out and becomes an open circuit.

FIG. 9 is a schematic circuit diagram of LED backup lighting package 500 of FIG. 5B when LED 502 is burned out and creates an open circuit. Current then flows through backup LED 504 and backup LED series resistor 508 ($R_3$) in parallel with parallel resistor 510 ($R_4$). Series resistor 506 ($R_2$) is out of the circuit.

Figure 10:
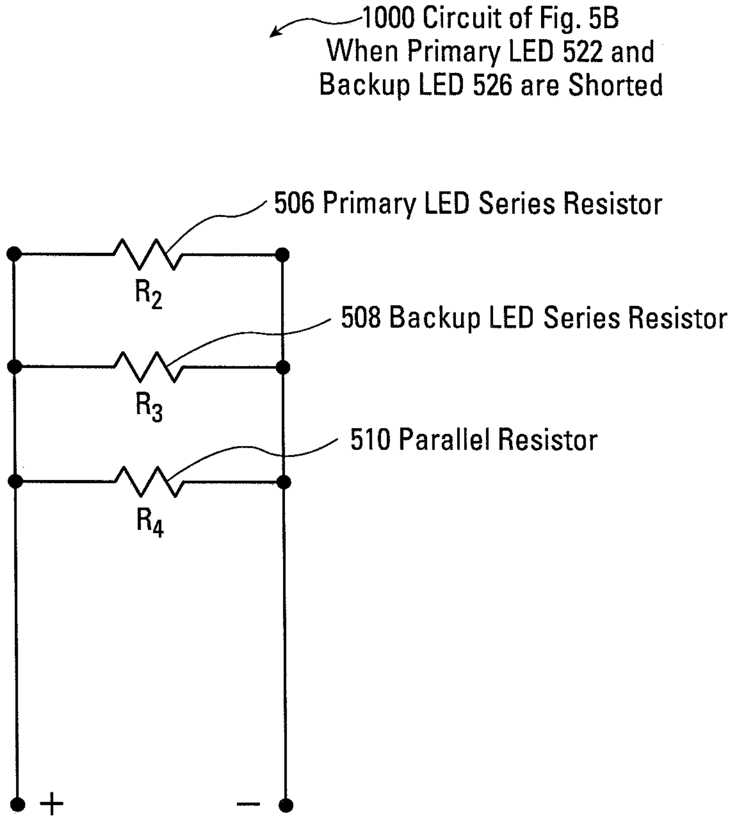
FIG. 10 is a schematic circuit diagram of FIG. 5B when LED 522 and LED 526 are shorted.

FIG. 10 is a schematic circuit diagram of LED backup lighting package 520 of FIG. 5B when primary LED 522 and backup LED 526 are shorted. As illustrated in FIG. 10, primary LED series resistor 506, backup LED series resistor 508 and parallel resistor 510 are all connected in parallel. The equivalent resistance then is the resistance of $R_2$, $R_3$ and $R_4$ connected in parallel.

The present invention therefore provides a number of different embodiments of circuits for lighting packages that create a reliable lighting system having backup, reserve LEDs that allow the LED packages to remain lit even when a primary LED in the circuit burns out and becomes and open circuit, or fails and becomes a short circuit. In addition, these circuits moderate the change in current that would otherwise flow through other LED packages that are connected in parallel when an LED is shorted or open, and does not short out the LED array when one of the LEDs fails and becomes a short circuit. The reliability and stability of these circuits allows these circuits to be hardwired, which eliminates the use of replacement bulbs that are subject to environmental damage and are otherwise unreliable. For example, replaceable bulbs may come loose from sockets during usage and sockets may become corroded and not provide sufficient connectivity. In addition, the cost of sockets for replacement bulbs is eliminated using the hardwired circuits, which can be waterproofed to prevent environmental damage during usage outdoors. Also, it is less expensive to use hardwired circuits and the usability of hardwired circuits is greater since replacement procedures can be confusing and replacement bulbs may not be readily available. Although the circuits disclosed herein may be somewhat less efficient than other circuits, the circuits of the various embodiments of the present invention provide a highly reliable and cost-effective system which is less expensive to manufacture. Further, the LED packages handle both short and open circuits of the LED and are capable of moderating the flow of current through the parallel connected packages to reduce variations in dimming and brightness as a result of short circuiting or open circuiting of LEDs.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A reliable light emitting diode package comprising:

a primary light emitting diode of said light emitting diode package, said primary light emitting diode having a first forward breakdown voltage;

a backup light emitting diode connected in parallel with said primary light emitting diode, said backup light emitting diode having a second forward breakdown voltage that is higher than said first forward breakdown voltage;

a parallel resistor that is connected in parallel with said primary light emitting diode having a selected parallel resistive value;

a series resistor connected in series with said primary light emitting diode, said backup light emitting diode and said parallel resistor, said series resistor having a selected series resistive value that is greater than said parallel resistor resistive value;

a voltage source connected to said light emitting diode package that supplies a DC voltage to said light emitting diode package to provide a voltage drop across said primary light emitting diode that is greater than said first forward breakdown voltage and less than said second forward breakdown voltage based upon said selected parallel resistive value and said selected series resistive value.

2. The reliable light emitting diode package of claim 1 further comprising:

additional light emitting diode packages connected in parallel to said reliable light emitting diode package with hardwired connections to form a reliable light emitting diode parallel array that is resistant to environmental effects.

3. The reliable light emitting diode parallel array of claim 2 further comprising:

a plurality of additional light emitting diode parallel arrays that are connected in series with said reliable light emitting diode parallel array to form a series connected parallel array.

4. The light emitting diode parallel array of claim 3 wherein said parallel resistor has a resistive value that is greater than a resistive value of said primary light emitting diode when said primary light emitting diode is lit.

5. The light emitting diode parallel array of claim 3 wherein said parallel resistor, said series resistor and said light emitting diode create a standardized input impedance, that substantially matches a standardized input impedance of said additional light emitting diode packages regardless of the type of light emitting diode used in said additional light emitting diode packages.

6. A method of making a reliable light emitting diode package comprising:

selecting a primary light emitting diode that has a first forward breakdown voltage that is less than a second forward breakdown voltage of a backup light emitting diode;

connecting said primary light emitting diode in parallel with said backup light emitting diode;

connecting a parallel resistor in parallel with said primary light emitting diode and said backup light emitting diode;

connecting a series resistor to said parallel resistor, said primary light emitting diode and said backup light emitting diode;

providing an input voltage to said light emitting diode package;

creating a voltage drop across said primary light emitting diode and said backup light emitting diode that is greater than said first forward breakdown voltage and less than said second forward breakdown voltage by selecting said input voltage and resistive values of said parallel resistor and said series resistor.

7. The method of claim 6 wherein said series resistor comprises a single series resistor connected to said parallel resistor, said primary light emitting diode and said backup light emitting diode on a first end of said single series resistor and to either said input voltage or an output on a second end of said single series resistor.

8. The method of claim 6 wherein said series resistor comprises a first series resistor connected to a first end of said parallel resistor, said primary light emitting diode and said backup light emitting diode and to said input voltage on a second end of said first series resistor, and a second series resistor connected to a second end of said parallel resistor, said primary light emitting diode and said backup light emitting diode.

* * * * *